US007022973B2

(12) United States Patent
Huang

(10) Patent No.: US 7,022,973 B2

(45) Date of Patent: Apr. 4, 2006

(54) ADVERTISING LIGHT EMITTING PEN HAVING A MOVABLE LIGHT EMITTING DEVICE

(76) Inventor: Ming Huang, 235 Chung-Ho Box 8-24, Taipei (TW)

( * ) Notice: Subject to any disclaimer, the term of this patent is extended or adjusted under 35 U.S.C. 154(b) by 179 days.

(21) Appl. No.: 10/666,760

(22) Filed: Sep. 22, 2003

(65) Prior Publication Data

US 2005/0061960 A1 Mar. 24, 2005

(51) Int. Cl.
*G01J 1/04* (2006.01)

(52) U.S. Cl. .............................. 250/227.13; 250/227.11

(58) Field of Classification Search ........... 250/227.13, 250/227.11; 362/579, 118, 109, 800, 577; 40/334, 905

See application file for complete search history.

(56) References Cited

U.S. PATENT DOCUMENTS 5,673,996 A * 10/1997 Ducker ....................... 362/118
6,238,057 B1 * 5/2001 Chen .......................... 362/118
6,299,372 B1 * 10/2001 Wang ......................... 362/118
6,682,212 B1 * 1/2004 Gao ........................... 362/579
2004/0161288 A1 * 8/2004 Tsai ........................... 362/118
2005/0036336 A1 * 2/2005 Yang .......................... 362/579

* cited by examiner

*Primary Examiner*—Que T. Le

(57) ABSTRACT

An advertising light emitting pen comprises an upper pen tube and a lower pen tube. The feature of the advertising light emitting pen is that a top of the light guide tube resists against a lower end of the light emitting device. A surface of the inner tube is coated with film having advertising patterns or texts thereon. The film includes two parts with one part being a transparent surface and another part being an opaque surface for printing with pattern or texts. The transparent surface has no pattern or text thereon. When the light emitting device lights up, light transmits into the inner tube through the light guide tube and then emits out from the inner tube; the light emits from the outer tube to radiate into a paper to be written.

5 Claims, 5 Drawing Sheets

ADVERTISING LIGHT EMITTING PEN HAVING A MOVABLE LIGHT EMITTING DEVICE

FIELD OF THE INVENTION

The present invention relates to pens, and particularly to an advertising light emitting pen which can emit light and has an effect of advertisement.

BACKGROUND OF THE INVENTION

In the prior art advertise pen, the patterns printed on a surface of the pen tube is easily worn when the pen is used for a longer time. Moreover, in the prior art, the patterns of an advertising light emitting pen is at a middle section of a pen and a light emitting body is displaced in a position with respect to the pattern so that the light emitting body at a middle or upper section of the pen. Thus, the light out of the pen can not clearly illuminate the paper which is placed near a lower section of the pen as the user writes on the paper. This is not beneficial at night. Therefore there is an eager demand for a novel design which can improve the defect in the prior art.

SUMMARY OF THE INVENTION

Accordingly, the primary object of the present invention is to provide an advertising light emitting pen which comprises an upper emitting device, and a push-and-brake device for driving the light emitting device to move. The lower pen tube includes an outer tube, an inner tube in the outer tube, a refill in the inner tube, a resilient spring in the inner tube and below the refill, and a light guide tube in the inner tube and being passed by an upper section of the refill. The feature of the advertising light emitting pen is that a top of the light guide tube resists against a lower end of the light emitting device. A surface of the inner tube is coated with film having advertising patterns or texts thereon. The film includes two parts with one part being a transparent surface and another part being an opaque surface for printing with pattern or texts. The transparent surface has no pattern or text thereon. When the light emitting device lights up, light transmits into the inner tube through the light guide tube and then emits out from the inner tube; the light emits from the outer tube to radiate into a paper to be written.

The various objects and advantages of the present invention will be more readily understood from the following detailed description when read in conjunction with the appended drawing.

DETAILED DESCRIPTION OF THE PREFERRED EMBODIMENTS

First Embodiment

Figure 1:
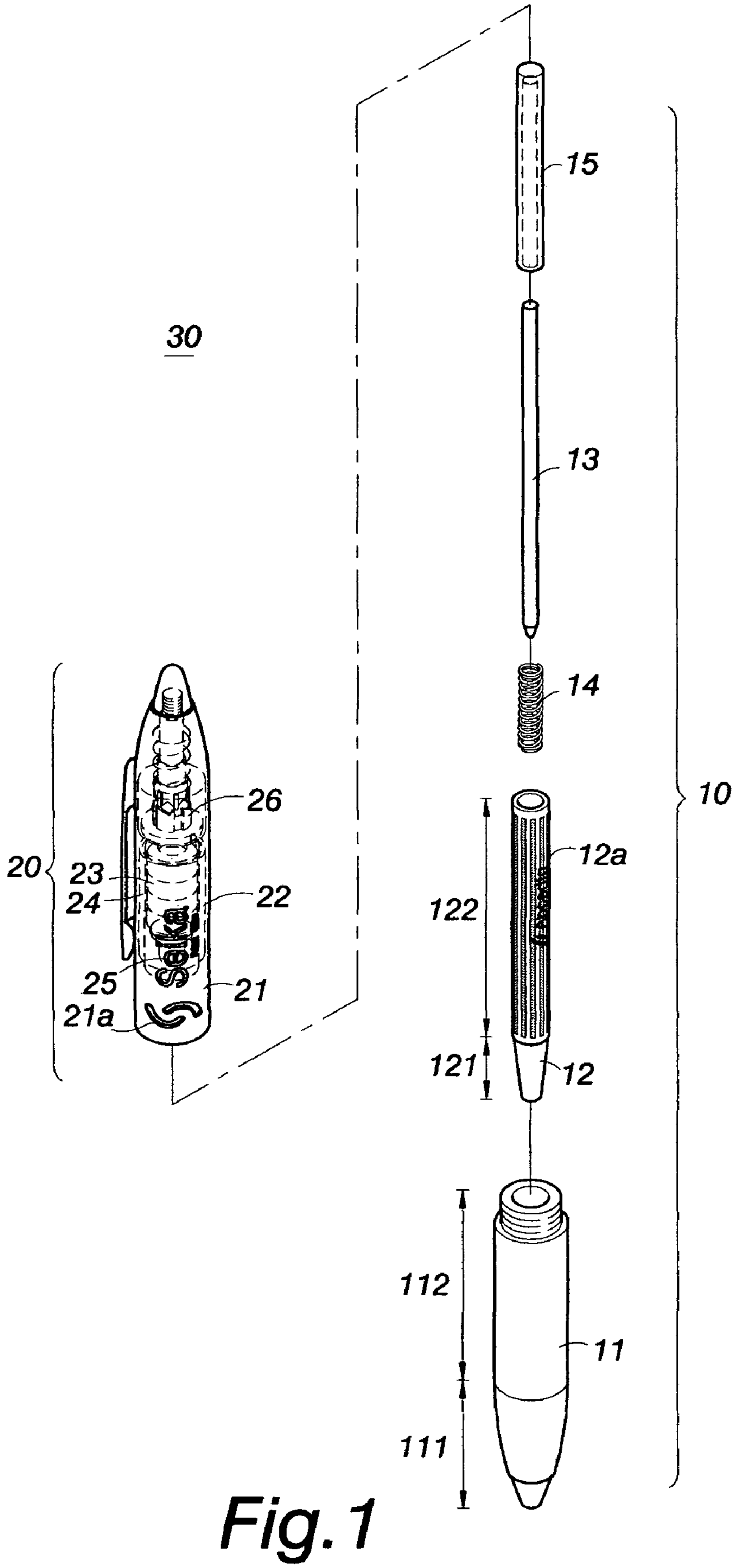
FIG. 1 is an exploded perspective view of the first embodiment of the present invention.
Figure 2:
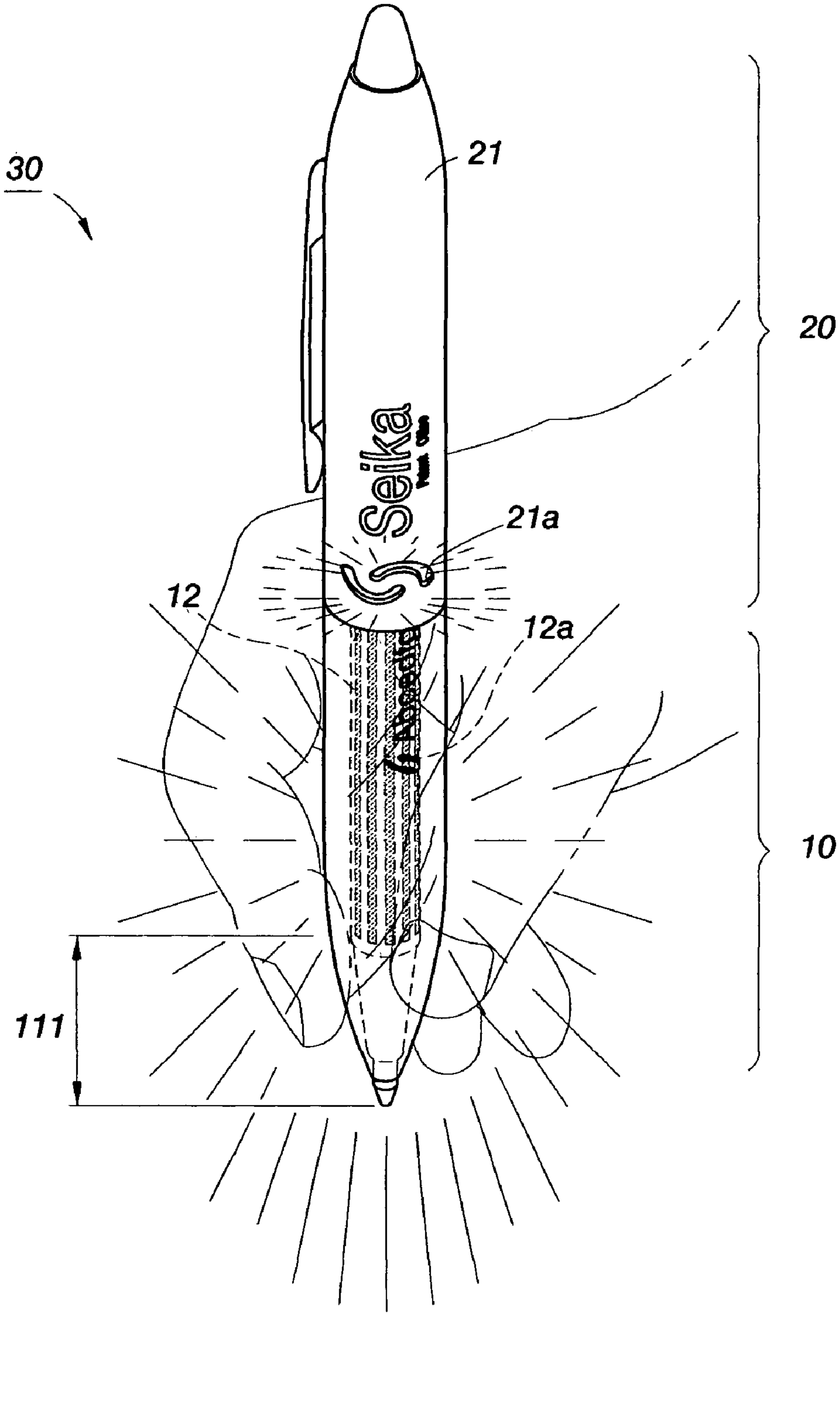
FIG. 2 is an assembled perspective view of the first embodiment of the present invention.
Figure 3:
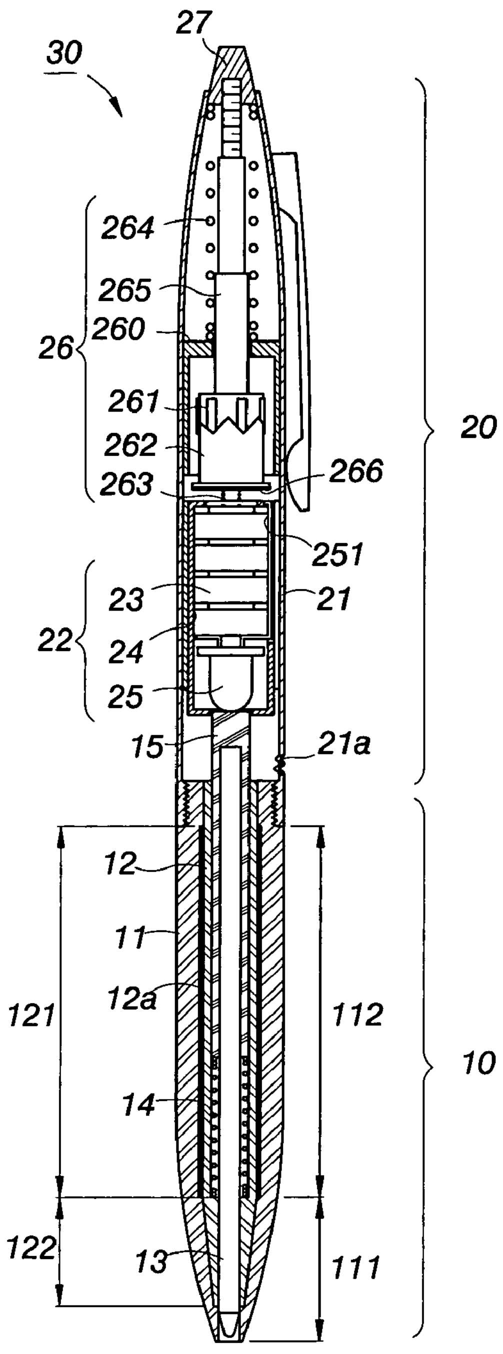
FIG. 3 is a cross section view of the first embodiment of the present invention.

Referring to FIG. 1, the exploded perspective view of the present invention is illustrated. FIG. 2 is an assembled perspective view and FIG. 3 is a cross section view of FIG. 1. In the drawing, the pen of the present invention includes an upper pen tube 20 and a lower pen tube 10. An advertising light emitting pen 30 is formed by assembling the upper pen tube 20 and lower pen tube 10. The upper pen tube 20 is a pressable pen tube which includes an outer tube 21, a light emitting device 22 in the outer tube 21 (the light emitting device 22 is formed by a liner tube 24, a battery set 23 in the liner tube 24, and a light emitting body 25 below the liner tube 24), a push-and-brake device 26 for driving the light emitting device 22 to move. The lower pen tube 10 includes a transparent outer tube 11, a transparent inner tube 12 in the transparent outer tube 11, a refill 13 in the inner tube 12, an resilient spring 14 in the inner tube 12 and below the refill 13, and a transparent light guide tube 15 in the inner tube 12 and being passed by an upper section of the refill 13.

The feature of the present invention will be described here. A top of the light guide tube 15 resists against a lower end of the light emitting device 22. A surface of the inner tube 12 is coated with film 12*a* having advertising patterns or texts thereon. The film 12*a* includes two parts with one part being a transparent surface and another part being an opaque surface for printing with pattern or texts. The transparent surface has no pattern or text thereon. The film is formed by screen printing, coating, sinking for dying, adhering, painting, etc. The film 12*a* may be formed by convex or concave patterns. It is preferred that the film 12*a* is installed at an upper disclosing section 112 above the outer tube holding section 111 so that the film 12*a* is not shielded by the fingers holding the pen. The hold portion 111 is a section for being held by the three fingers holding the pen (including a thumb, a forefinger, and a middle finger). When the inner tube 12 is placed into the outer tube 11, the lower section 121 is exactly at the same level as the holding section 111. Therefore, the film 12*a* will not be affected by the holding of the pen.

Figure 4:
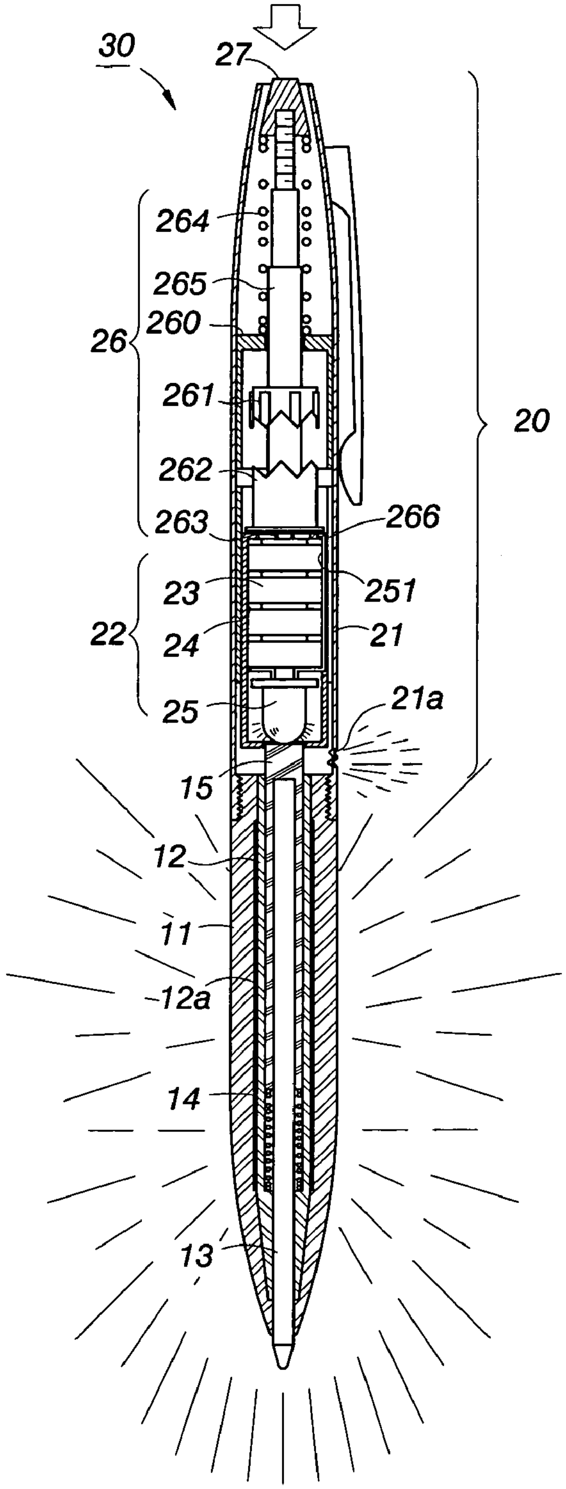
FIG. 4 is a schematic view about the operation of the first embodiment of the present invention.
Figure 5:
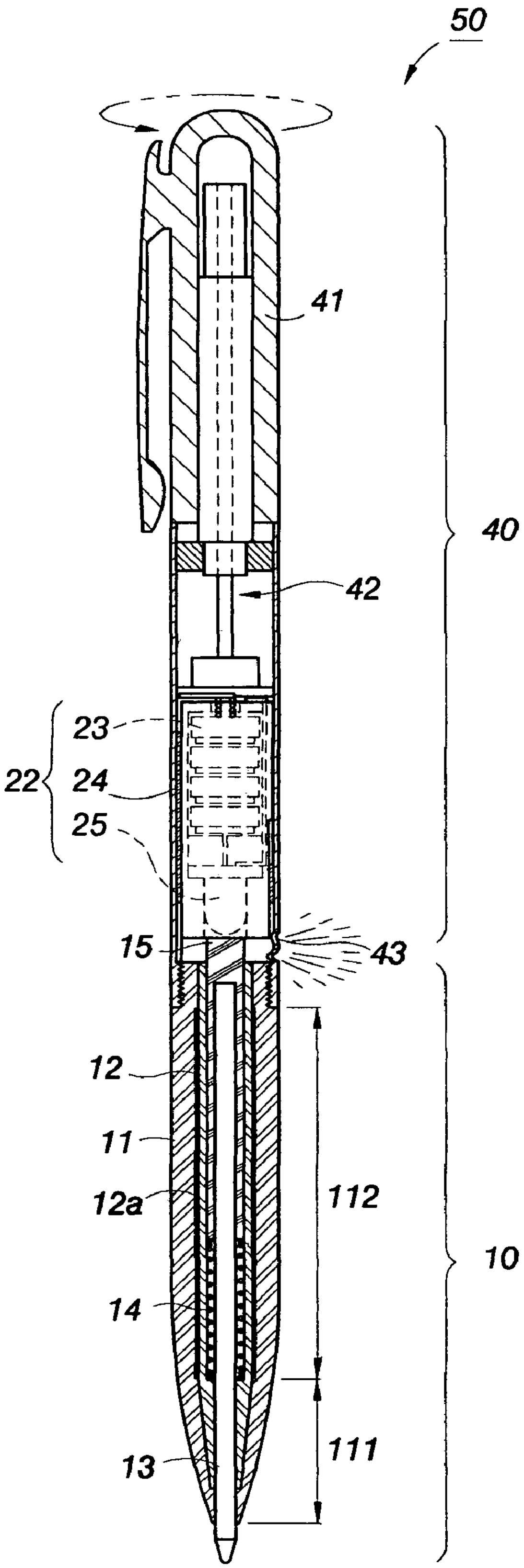
FIG. 5 is a schematic view of the second embodiment of the present invention.

Referring to FIG. 4, when the lighting emitting body 25 lights up, light emits downwards through the light guide tube 15, and then emits out through the inner tube 12 so that patterns or texts on the film 12*a* are displayed clearly. Thereby, the light is reflected through the transparent outer tube 11 and incident to the paper for writing. When the patterns or texts are concave or convex patterns or texts, the patterns or texts will have vivid images by the impinging of the light from the inner tube 12.

Referring to FIGS. 1 and 2, a hollowed pattern 21*a* is formed by hollowing the wall at a lower end of the outer tube 21 of the upper pen tube 20. The hollow pattern 21*a* is formed by punching or molding, etc. and may be a trademark. The position of the hollowed pattern 21*a* is aside the light emitting device 22. When the light emitting device 22 lights up, the light passes through the hollowed pattern 21*a*. It is preferable that the light emitting device emits colored lights.

Above mentioned outer tube 11, inner tube 12 and lower pen tube 20 are transparent. The light guide tube 15 has a function of stabling refill 13. A top of a transparent upper plastic solid body of the light guide tube 15 is in contact with the light emitting body 25. Thereby, light can be guided by the light guide tube 15 so that light is transferred from the upper end to the lower end. The light guide tube 15 can be integrally formed with the refill 13. Moreover, in the present invention, the light guide tube 15 can be neglected, however this will induce a poor light guide effect. The refill 13 must be formed with two protrusions (not shown) at a predetermined position of the outer wall thereof for stopping the resilient spring 14.

Referring to FIGS. 3 and 4, the structure of the upper pen tube 20 is illustrated. A pressable pen tube of any type is suitable to be used as the upper pen tube 20. The push-and-brake device 26 of upper pen tube 20 includes a sleeve 260 in the outer tube 21, an upper clutch rod 261, a lower clutch tube 262 matching to the upper clutch rod 261, a conductive spring 263 between the lower clutch tube 262 and the light emitting device 22 (an upper end of the conductive spring 263 is in contact with the conductive sheet 266 at a bottom of the lower clutch tube 262; and a lower end of the conductive spring 263 is in contact with a positive elect-rode of the battery set 23), and an expandable spring 265 inserted by a shaft 264 of the upper clutch rod 261. An upper end of the shaft 264 is screwed with a button 27. When the button 27 is pressed, the push-and-brake device 26 will enforce the light emitting device 22 to move downwards so that the light guide tube 15 and the refill 13 will descend at the same time. Moreover, the conductive sheet at a bottom of the lower clutch tube 262 is in contact with the conductive pin 251 at the top of the light emitting device 22 so that the light emitting body 25 emits light. Further, when the button 27 is pressed again, above elements will restore to the original position. Then the refill 13 moves upwards by the pushing force of the resilient spring 14. Then the refill 13 is embedded into the outer tube 11. Then the light emitting body 25 stops to light up. Since the structure of the upper pen tube 20 is known in the prior art, the details will not be described here.

With reference to FIG. 4, since the light guide tube 15 causes the light to transfer from the upper end to the lower end. The transparent inner tube 12 enclosing the light guide tube 15 and the transparent outer tube 11 enclosing the inner tube 12 causes the light emits out from the light guide tube 15 through the transparent inner tube 12 and outer tube 11 so that the lower section of the advertising light emitting pen 30 can light up. Since the film 12*a* is on the surface of the inner tube 12, when light emits from the inner tube 12, the patterns or texts on the film 12*a* appear clearly so as to achieve the effect of advertisement. Moreover, the film 12*a* is between the inner tube 12 and the outer tube 11, it is not worn or vague by the holding of the pen.

Second Embodiment

Referring to FIG. 4, a cross section view about the advertising light emitting pen of the present invention is illustrated. The difference of this embodiment to the above embodiment is that the upper pen tube 40 is a rotatable pen tube which is known in the prior art and thus the details will not be described here. The structure of the lower pen tube 10, light emitting device 22 and film 43 on the outer tube 41 are the same as above mentioned embodiment. When the user rotates the outer tube 41 of the upper pen tube 40, the actuation device 43 can be driven to rise or descend so as to emit light and rise or descend the refill 13. For example, when the outer tube 41 rotates clockwise, the light emitting device 22 will be driven to emit light and the refill 13 protrudes from the outer tube 11. Moreover, when the upper pen tube 40 rotates counterclockwise, the light emitting device 22 will not light up and the refill 13 embeds into the outer tube 11.

Third Embodiment

Figure 6:
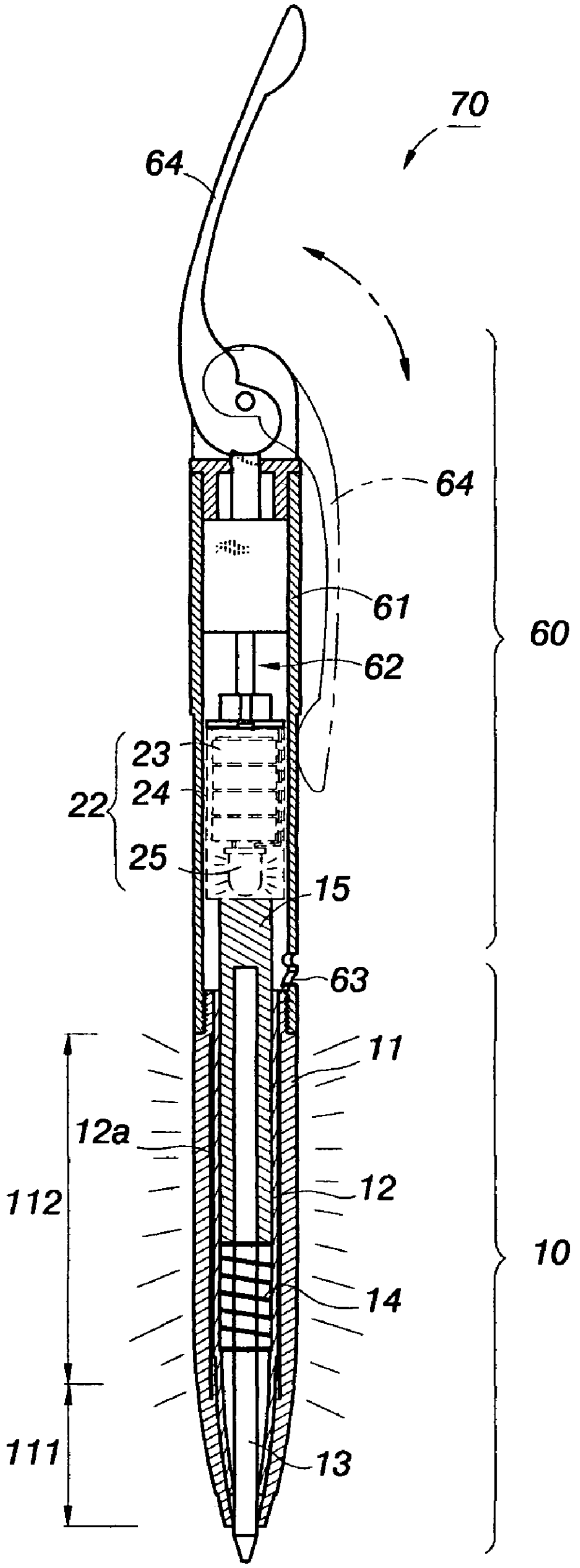
FIG. 6 is a schematic view of the third embodiment of the present invention.

Referring to FIG. 6, a cross section view of the advertising light emitting pen in the third embodiment of the present invention is illustrated. The difference of this embodiment to the above embodiment is that the upper pen tube 60 has a rotatable rod 64. In this embodiment, the lower pen tube 10, light emitting device 22, and the hollowed pattern 63 in the outer tube 61 is the same as those in the first embodiment. When the user rotates the rotatable rod 64, the actuation device 62 in the upper pen tube 60 will rise or descend so as to emit light or protrude the refill 13. For example, when the rod 64 is rotated upwards, the light emitting device 22 lights up and the bottom of the refill 13 protrudes from the outer tube. Moreover, when the rod 64 is rotated downwards (as shown by the dashed line), the light emitting device 22 dose not light up and the refill 13 embeds into the outer tube 11.

Advantages of the present invention will be described here. The lower section of the advertising light emitting pen has a preferred advertise effect. The patterns or texts are not affected by holding of the pen. The lower section of the advertising light emitting pen can light up so as to appear the patterns or texts on the film and moreover, the light incidents into the paper so as to assist the writing of the advertising light emitting pen. Moreover, the hollowed pattern cap show the trademark of a corporation. Moreover, the position of the film will not affect by the holding of the pen.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An advertising light emitting pen comprising an upper pen tube and a lower pen tube; the upper pen tube including a light emitting device, and a push-and-brake device for driving the light emitting device to move; the lower pen tube including an outer tube, an inner tube in the outer tube, a refill in the inner tube, a resilient spring in the inner tube and below the refill, and a light guide tube in the inner tube and being passed by an upper section of the refill;

wherein a top of the light guide tube resists against a lower end of the light emitting device; a surface of the inner tube is coated with film having advertising patterns or texts thereon; the film basically is transparent except pattern or texts; when the light emitting device lights up, light transmits into the inner tube through the light guide tube and then emits out from the inner tube; the light emits from or reflects through the outer tube to radiate onto a paper to be written.

2. The advertising light emitting pen as claimed in claim 1, wherein predetermined parts of a lower end of an outer tube of the upper pen tube are hollowed to form a pattern; and a position of the pattern sets aside the light emitting device.

3. The advertising light emitting pen as claimed in claim 1, wherein the light guide tube is integrally formed with the refill.

4. The advertising light emitting pen as claimed in claim 1, wherein the patterns or texts on the film are concave or convex from a surface of the film.

5. The advertising light emitting pen as claimed in claim 1, wherein the film on the surface of the inner tube is above a section which is held by fingers of a writer.

* * * * *